US012640126B2

(12) United States Patent
May

(10) Patent No.: US 12,640,126 B2
(45) Date of Patent: May 26, 2026

(54) TRI-COLUMN AIRLIFT BASS STAND

(71) Applicant: Randall May International Incorporated, Irvine, CA (US)

(72) Inventor: Randall L. May, Irvine, CA (US)

(73) Assignee: Randall May International, Inc., Irvine, CA (US)

( * ) Notice: Subject to any disclaimer, the term of this patent is extended or adjusted under 35 U.S.C. 154(b) by 305 days.

(21) Appl. No.: 17/985,503

(22) Filed: Nov. 11, 2022

(65) Prior Publication Data

US 2023/0154443 A1 May 18, 2023

Related U.S. Application Data

(60) Provisional application No. 63/278,798, filed on Nov. 12, 2021.

(51) Int. Cl.
*G10D 13/00* (2020.01)
*F16M 11/18* (2006.01)
*F16M 11/28* (2006.01)
*G10D 13/10* (2020.01)

(52) U.S. Cl.
CPC ............. *G10D 13/28* (2020.02); *F16M 11/18* (2013.01); *F16M 11/28* (2013.01)

(58) Field of Classification Search
CPC .......... G10D 13/28; G10D 13/02; G10D 3/02; G10D 1/08; G10D 3/04; G10D 3/06; G10D 3/10; G10D 3/14; F16M 11/18; F16M 11/28
See application file for complete search history.

(56) References Cited

U.S. PATENT DOCUMENTS

| | | | |
|---|---|---|---|
| 5,054,357 A | * | 10/1991 | Pyle .......................... G10G 5/00 84/421 |
| 6,323,407 B1 | | 11/2001 | May |
| 6,881,886 B2 | | 4/2005 | May |
| 7,166,790 B2 | | 1/2007 | May |
| 7,326,824 B2 | | 2/2008 | Campbell et al. |
| 7,326,842 B2 | | 2/2008 | May |
| 7,394,008 B2 | | 7/2008 | May |
| 7,420,110 B2 | | 9/2008 | May |
| 7,438,266 B2 | | 10/2008 | May |
| 7,588,228 B2 | | 9/2009 | May |
| 7,673,776 B2 | | 3/2010 | May |
| 7,703,725 B2 | | 4/2010 | May |
| 7,718,878 B2 | | 5/2010 | May |
| 7,810,684 B2 | | 10/2010 | May |
| 8,513,510 B1 | * | 8/2013 | Huang ................... G10D 13/02 84/421 |

(Continued)

FOREIGN PATENT DOCUMENTS

JP 2022071521 A * 5/2022 ............. G10D 13/03

*Primary Examiner* — Kimberly R Lockett

(74) *Attorney, Agent, or Firm* — Crowell & Moring LLP

(57) ABSTRACT

A percussion instrument stand includes a plurality of support columns. Each support column is associated with a respective support leg that supports the support column off of a standing surface. The percussion instrument stand also includes an instrument mount configured to support a percussion instrument thereon so as to be vertically supported by one or more of the support columns. At least one coupler is provided so as to engage each of the support columns and thereby resist a horizontal torque exerted on the percussion instrument.

16 Claims, 7 Drawing Sheets

(56)                    References Cited

U.S. PATENT DOCUMENTS

| | | | |
|---|---|---|---|
| 8,633,365 | B2 | 1/2014 | May |
| 8,646,666 | B2 | 2/2014 | May |
| 9,377,158 | B2 | 6/2016 | May |
| 9,858,908 | B2 | 1/2018 | May |
| 9,863,573 | B2 | 1/2018 | May |
| 9,881,595 | B2 | 1/2018 | May |
| 10,167,994 | B2 | 1/2019 | May |
| 10,885,888 | B2 | 1/2021 | May |
| 2004/0159211 | A1 * | 8/2004 | Crouch .................. G10G 5/005 84/421 |
| 2023/0015443 | A1 | 1/2023 | Giladi |

\* cited by examiner

400A

400C

400B

TRI-COLUMN AIRLIFT BASS STAND

CROSS REFERENCE TO RELATED APPLICATION

This application claims priority to Provisional Application No. 63/278,798, filed Nov. 12, 2021, the entire contents of which are hereby expressly incorporated by reference herein.

BACKGROUND OF THE INVENTION

This disclosure relates to improvements in hardware for mounting percussion instruments, namely, drum suspension hardware.

Percussion instruments are known to be mechanically mounted on support structures, e.g., stands, kit frames, carriers, etc., so that they may be played. For example, U.S. Pat. No. 7,588,228, incorporated herein by reference in its entirety, describes stands for supporting marching bass drums. These marching bass drums are typically mounted on such stands so that their playing surfaces are vertically oriented.

In the case of marching bands, it is desirable for bass drums to be removed from personal carriers (i.e., carriers that allow the user to support the bass drum on the user's person in playing position while marching) and subsequently mounted on stands positioned on the ground or other playing surfaces (e.g., bleachers, etc.) so that the user may play the bass drum while it is mounted on the stand. In competitive (and even non-competitive) marching band performances, it is highly desirable to achieve a quick and seamless transition between carrier mounted and stand mounted playing. However, due to the large and heavy nature of the bass drum, and to the complexity of both carrier and stand mounting, such quick and seamless transitions are difficult to achieve.

Moreover, when the marching bass drum is carrier mounted (as described in U.S. Pat. No. 7,326,842, incorporated herein by reference in its entirety), the playing torque is absorbed by the user supporting the drum. The playing torque is the horizontal torque applied to the bass drum by the user hitting the playing surfaces (e.g., with a mallet). Because the playing torque is absorbed by the user when the bass drum is carrier mounted, both playing surfaces (i.e., drum heads) of the bass drum remain relatively stable. That playing surface stability is vital to retaining a player's existing technique or further developing greater technical skills with increasing difficulty.

By contrast, when the bass drum is stand mounted, the playing torque is no longer absorbed by the user. Thus, the movement/torque applied to the bass drum by the user while playing it results in the bass drum undesirably twisting or otherwise being displaced with the mallet impact. As a result, the desired stability is no longer achieved.

This resulting instability is generally tolerated by performers as a trade-off to reduce performer fatigue. However, it is understood that using bass drum stands (e.g., for rehearsal, for in-the-bleachers performance, etc.) can be disruptive to the musicianship of the user. In particular, the development of the user's muscle memory and technical refinement can suffer, due to users adjusting their playing technique to accommodate the less stable stand mounted bass drum. This in turn promotes variances in sound and ensemble uniformity, both within the marching band and between carrier mounted and stand mounted performances.

It is therefore desirable to provide advantages over such known systems and methods. Other features and advantages of the present invention will become apparent from the following more detailed description, taken in conjunction with the accompanying drawings, which illustrate, by way of example, the principles of the presently described embodiments.

DETAILED DESCRIPTION OF THE PREFERRED EMBODIMENTS

Figure 1:
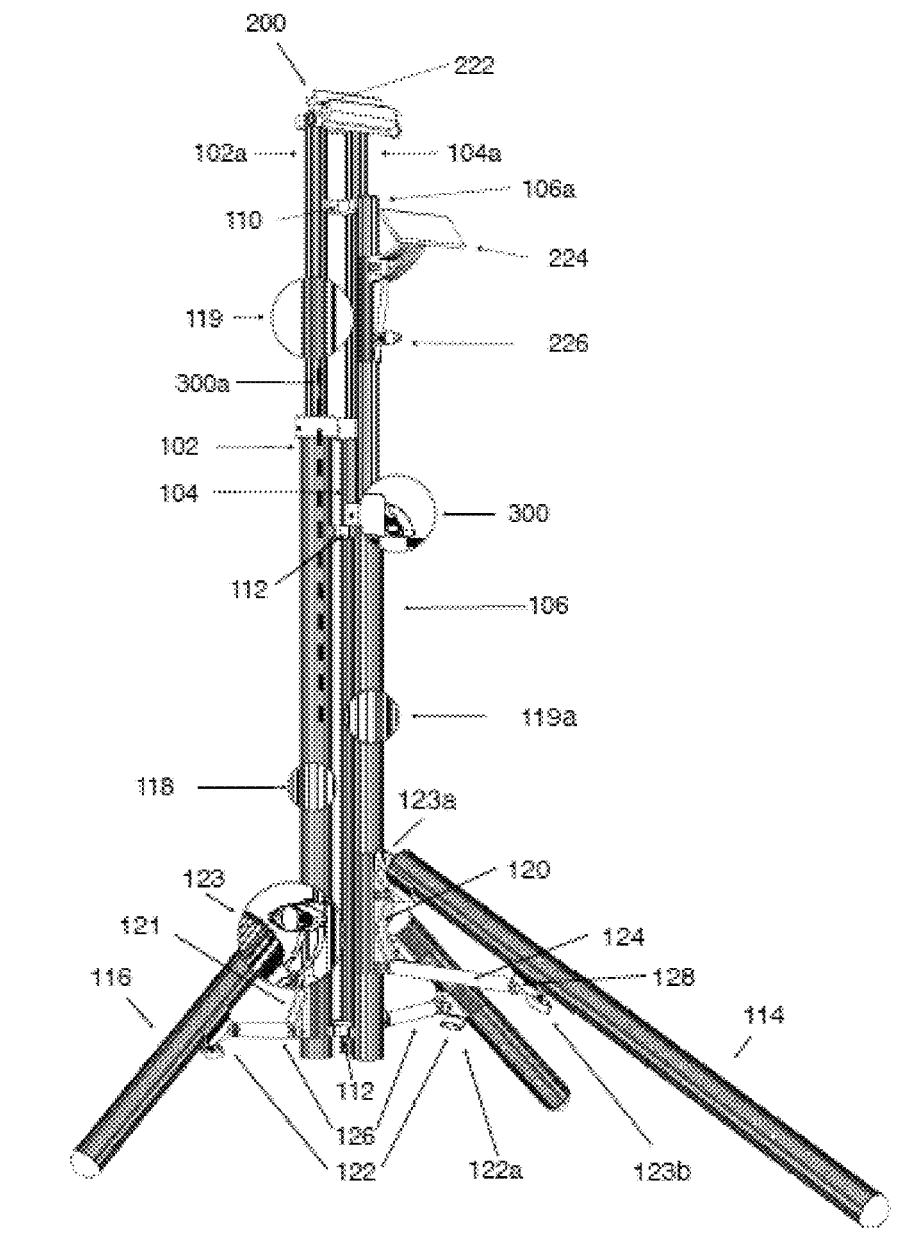
FIG. 1 illustrates percussion instrument stand according to at least one embodiment.
Figure 2:
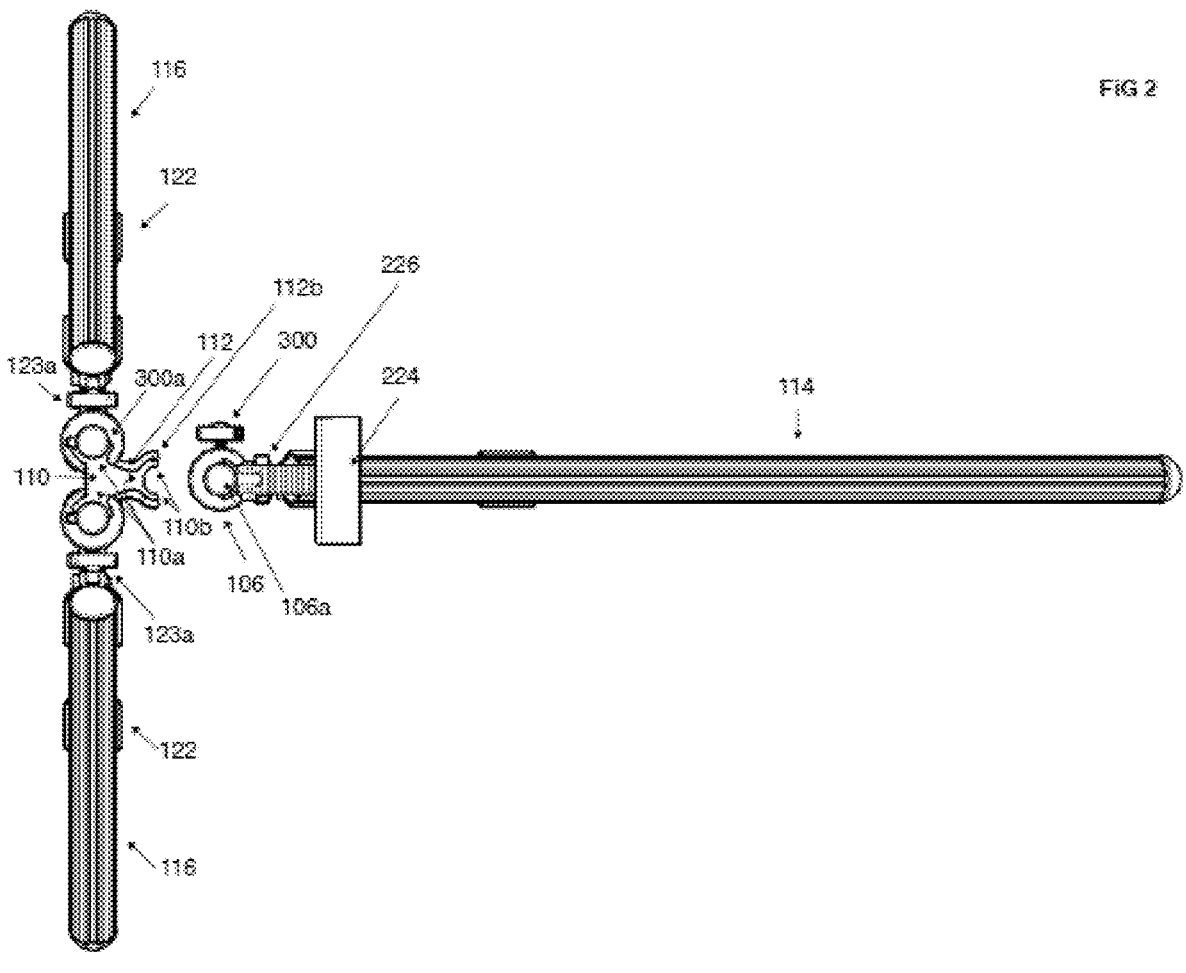
FIG. 2 is a partially exploded view of the percussion instrument stand according to at least one embodiment.

The above described drawing figures illustrate the disclosed invention in at least one embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

FIGS. 1-5 illustrate exemplary percussion instrument stands according to at least one embodiment.

The percussion instrument stand 100 includes a plurality of support columns 102/102a, 104/104a, 106/106a, each support column associated with a support leg 114/116 that supports the support column off of a standing surface (e.g., the ground, a stage, a bleacher surface, etc.). The percussion instrument stand 100 further includes an instrument mount 200/222 configured to support a percussion instrument thereon so as to be vertically supported by one or more of the support columns.

At least one coupler 110/112 is provided to engage each of the support columns so as to resist a horizontal torque exerted on a percussion instrument. Accordingly, the coupler 110/112 may comprise a body that substantially bridges the space between support columns so as to transfer horizontal force between columns. In some embodiments, the coupler body may be substantially planar in the horizontal direction.

The coupler 110/112 may further include one or more receptacles configured to receive respective support columns and thereby form a bridge, with the coupler body, between support columns. The receptacle may be substantially c-shaped. In some embodiments, the receptacle may be configured to engage one or more lineal grooves 119 of the support columns. The receptacles may further permit longitudinal adjustment of the coupler along the support columns.

In at least one embodiment, the support columns may be arranged in a parallel triangular orientation, as shown. That is, the support columns may be oriented vertically parallel to each other at horizontal positions corresponding to the vertices of a triangle. Accordingly, the coupler body may be substantially triangular and the receptacles may be located at each vertex of the triangular shaped body.

In at least one embodiment, the support columns may be arranged in a polygonal orientation, e.g., as four or five parallel columns. That is, the support columns may be oriented vertically parallel to each other at horizontal positions corresponding to the vertices of a polygon. Accordingly, the coupler body may be substantially polygonal and the receptacles may be located at each vertex of the polygonal shaped body.

It will be understood, however, that the coupler may engage less than all of the support columns. In particular, the coupler may engage two or more of the support columns. In such embodiments, the receptacles may be located at any vertices of the body for which engagement with the corresponding support column is desired. It is preferable, however, that the arrangement of the coupler is such that the percussion instrument stand, via the coupler, resists resist horizontal torque exerted on the percussion instrument it supports.

In some embodiments, one or more of the support columns may be telescoping support columns, each having a base portion 102, 104, 106 that telescopically engages an upper portion 102a, 104a, 106a such that the length of the telescoping support column is adjustable telescopically. In such embodiments, the coupler may engage the support columns at respective upper portions 102a, 104a, 106a and/or base portions 102, 104, 106 thereof. In particular, a travel coupler 110 may engage the support columns at respective upper portions 102a, 104a, 106a. The travel coupler 110 may have a body 110a with receptacles 110b for engaging the grooves 119 of respective upper portions 102a, 104a, 106a. Additionally, or alternatively, a stationary coupler 112 may engage the support columns at respective base portions 102, 104, 106. The stationary coupler 112 may have a body 112a with receptacles 112b for engaging the grooves 118, 119a of respective base portions 102, 104, 106.

In some embodiments, one or more of the support columns may be mechanically assisted support columns having integrated gas springs 300a. Such mechanical assists are described in U.S. Pat. No. 7,438,266, which is herein incorporated by reference in its entirety.

In some embodiments, the percussion instrument stand 100 may include lateral support legs 116. The lateral support legs 116 may be longitudinally slidable independently from each other on respective base portions 102, 104 via connected c-shaped travel collars 121 that may engage groves 118 on the base portions 102, 104 so as to permit repositioning of the lateral support legs 116 via the longitudinal sliding. The lateral support legs may be secured in position via a locking component 123, as shown. The c-shaped collars 121 may also be of o-shaped circumstantial construction, while still allowing for the lateral support legs to be longitudinally slidable independently on the respective base portion. The lateral support legs 116 may further have slidably adjustable c-shaped collars 122 connected to a leg brace 126 so as to alter an extension of the lateral support legs 116. The lateral support legs may be secured in position with locking component 122a.

In some embodiments, the percussion instrument stand 100 may include a front support leg 114. The front support leg may be longitudinally slidable independently on base portion 106 via connected c-shaped travel collar 120 that may engage groves 119a on base portion 106 so as to permit repositioning of the front support leg 114 via the longitudinal sliding. The front support leg may be secured in position with locking component 123a, as shown. The c-shaped collar 120 may also be of o-shaped circumstantial construction, while still allowing for the front support leg to be longitudinally slidable independently on the base portion 106. The front support leg 114 may further have slideably adjustable c-shaped collars 128 connected to a leg brace 124 so as to alter the extension of front support leg 114. The front support leg may be secured in position with locking component 123b.

Exemplary slideably adjustable support legs are described in U.S. Pat. No. 7,703,725, which is incorporated herein by reference in its entirety.

Figure 3:
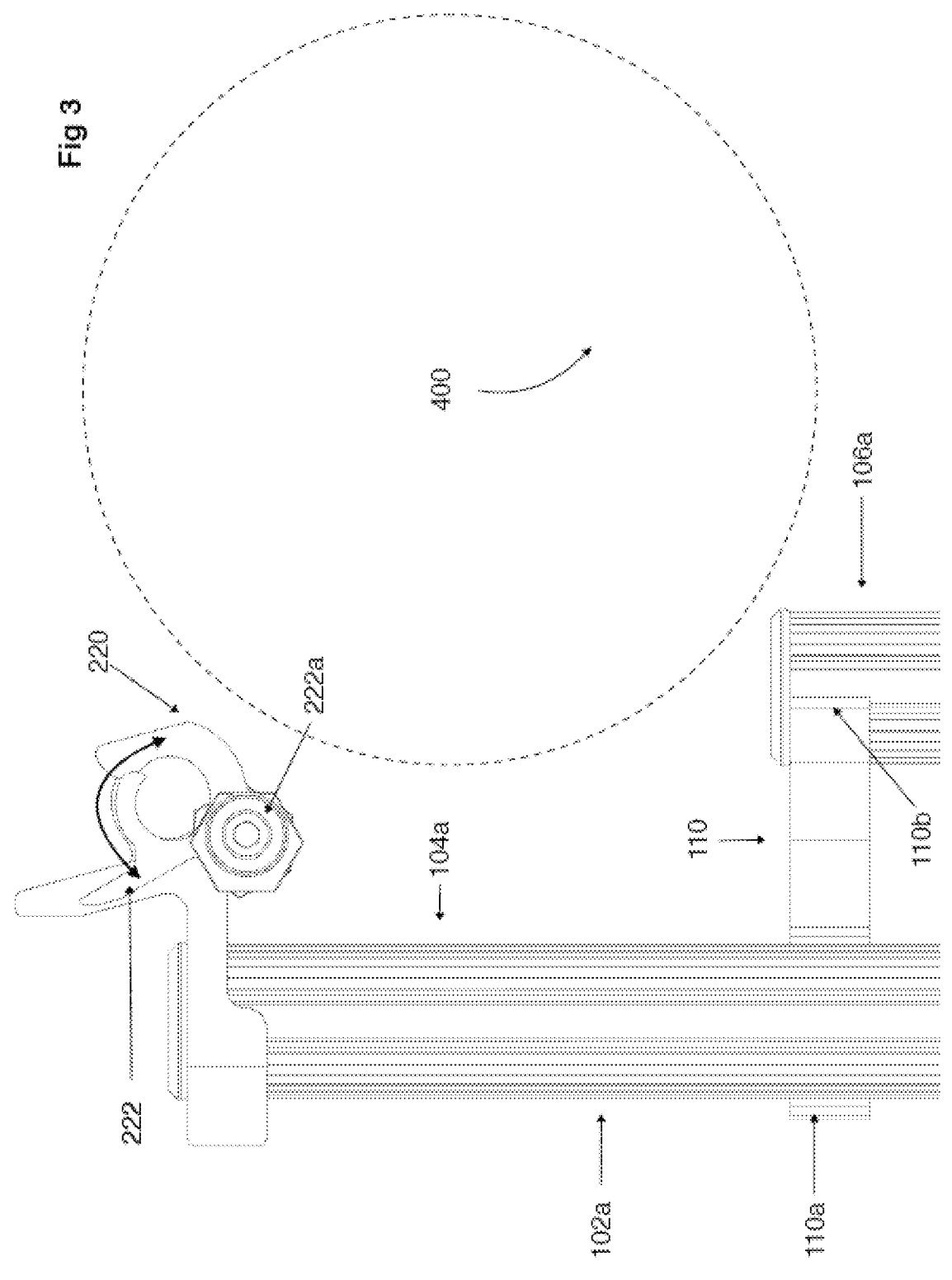
FIG. 3 is a close-up of aspects of the percussion instrument stand according to at least one embodiment.
Figure 4:
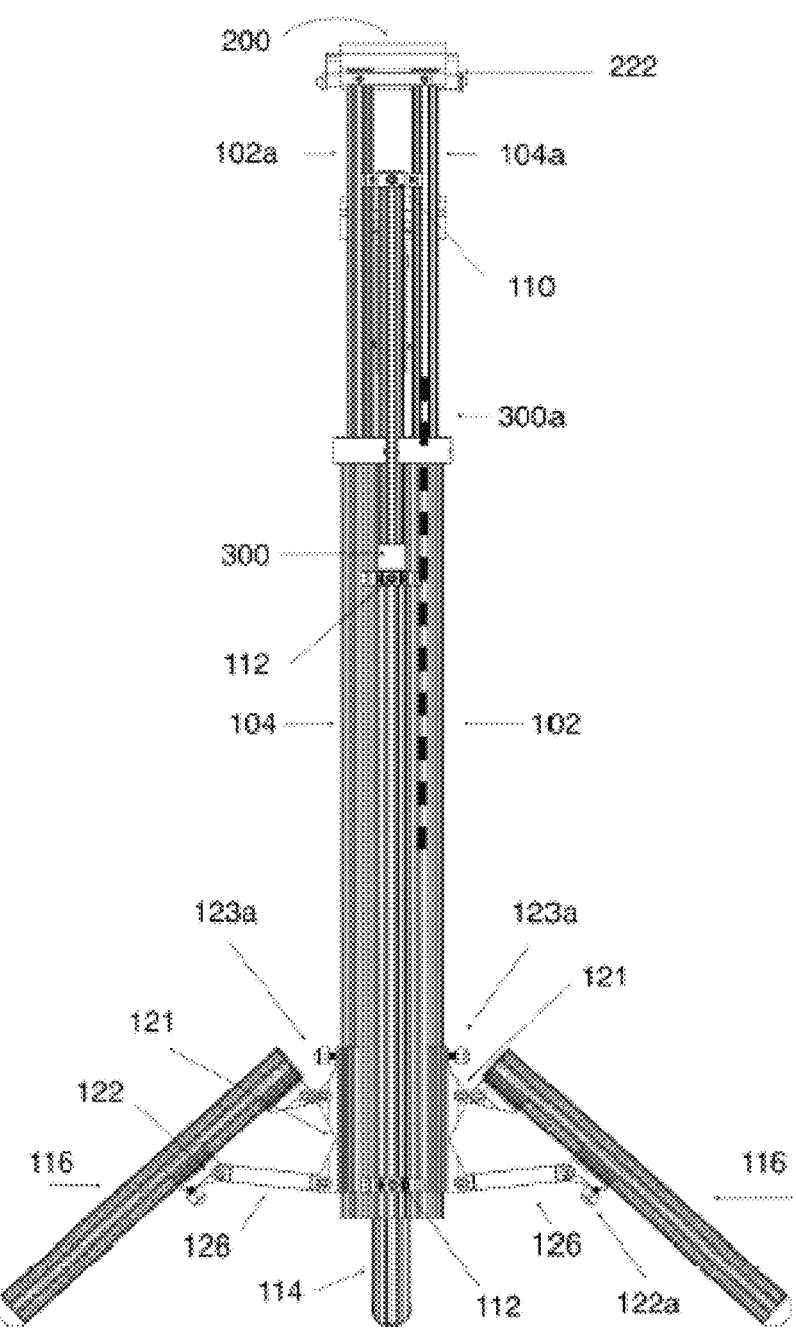
FIG. 4 schematically illustrates aspects of the percussion instrument stand according to at least one embodiment.
Figure 5:
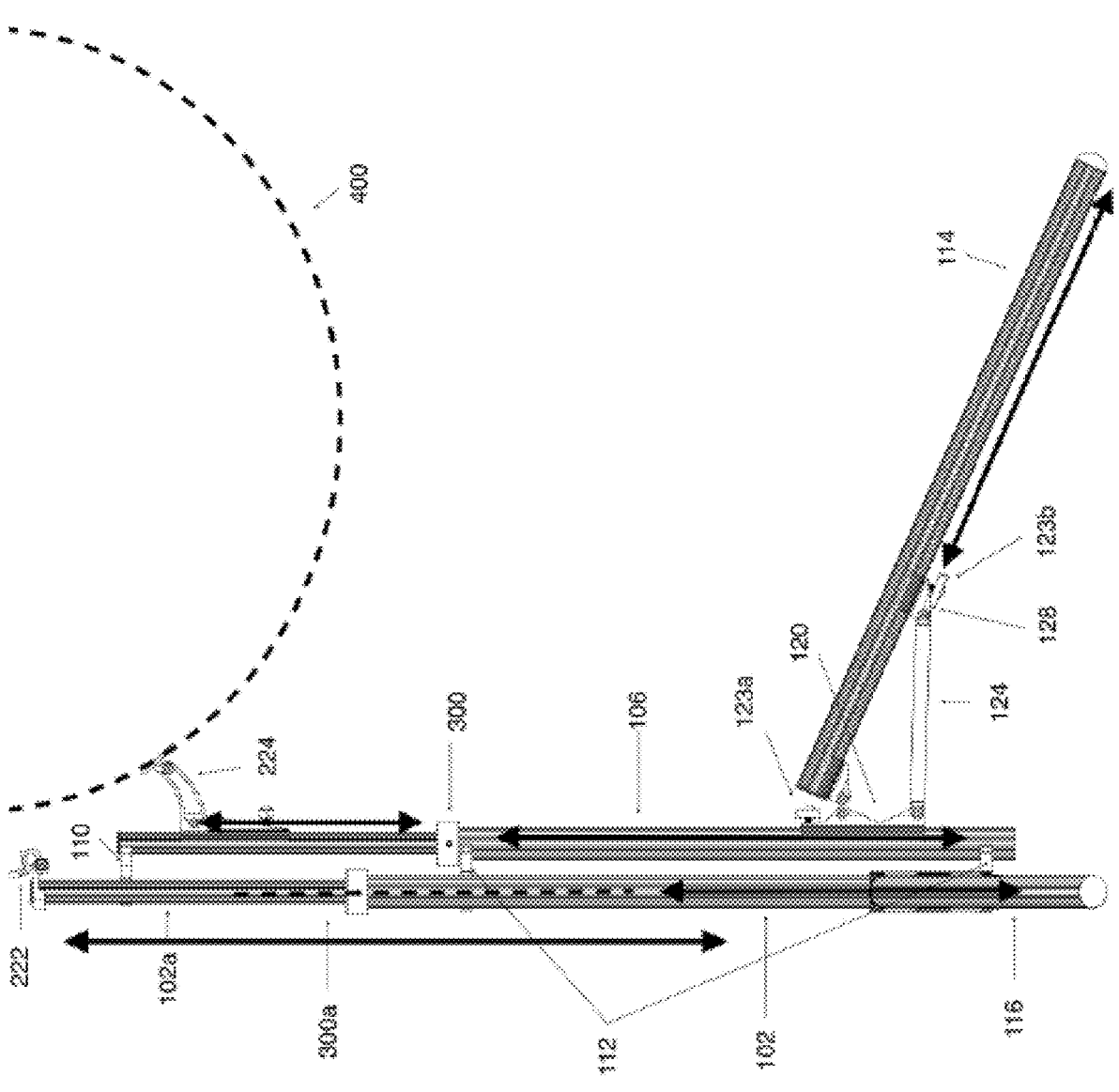
FIG. 5 schematically illustrates aspects of the percussion instrument stand according to at least one embodiment.

The instrument mount 200/222 may comprise a saddle receiver 200 with a catch-lock (or snap-lock) cam mechanism 222. As shown in FIG. 3, the saddle receiver 200 may comprise one or more j-shaped components configured to receive a tube bridge 440A (or tube lug) of the percussion instrument 400. The catch-lock cam mechanism 222 may be rotatable about a horizontal axis so as to secure the tube bridge 440A (or tube lug) within the saddle receiver 200. In operation, the tube bridge 440A (or tube lug) of the percussion instrument is gravity assisted to drop into the saddle receiver 200 so as to seat to the bottom of saddle and thereby actuate the catch-lock cam mechanism 222 to close and thereby secure the tube bridge (or tube lug) within the saddle receiver 200. The catch-lock cam mechanism 222 may be configured to be manually rotatable about the horizontal axis to engage and disengage the tube bridge 440A without the necessity of external tools. In some embodiments, the catch-lock may be omitted.

Figure 6:
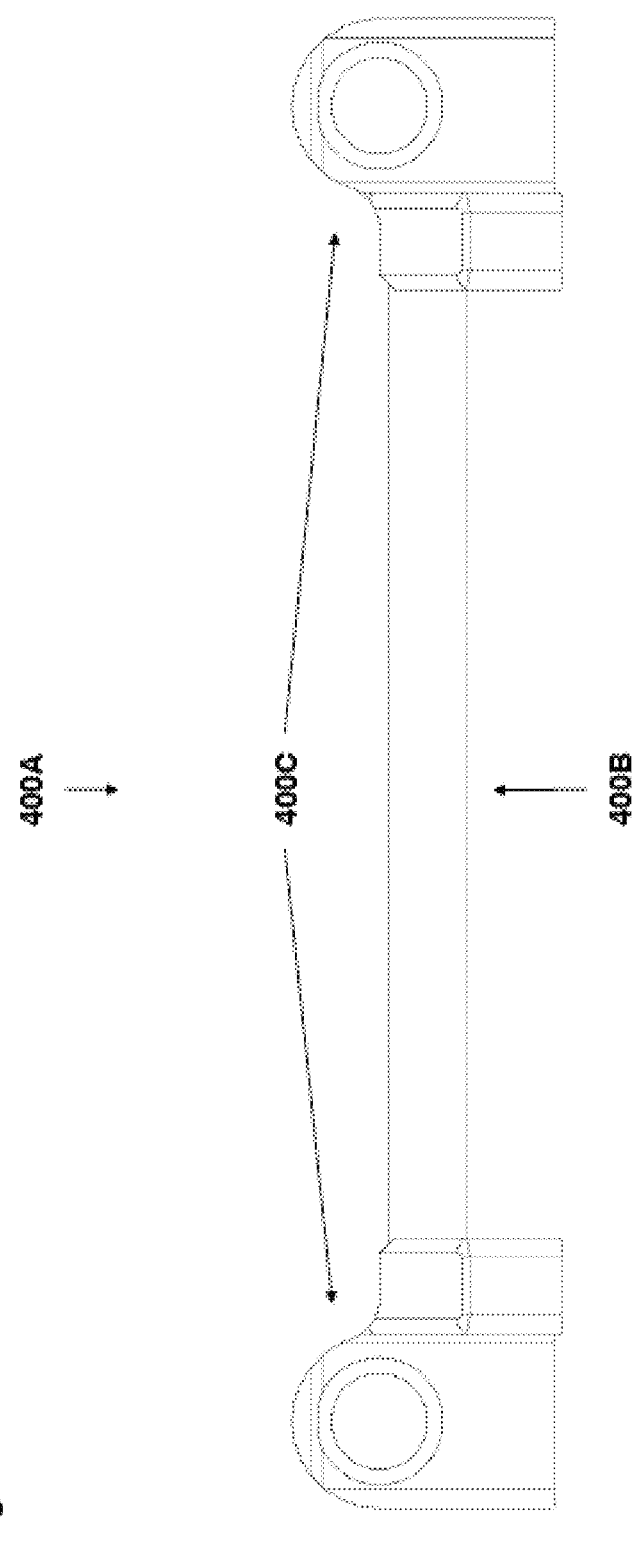
FIG. 6 illustrates percussion instrument hardware according to at least one embodiment.
Figure 7:
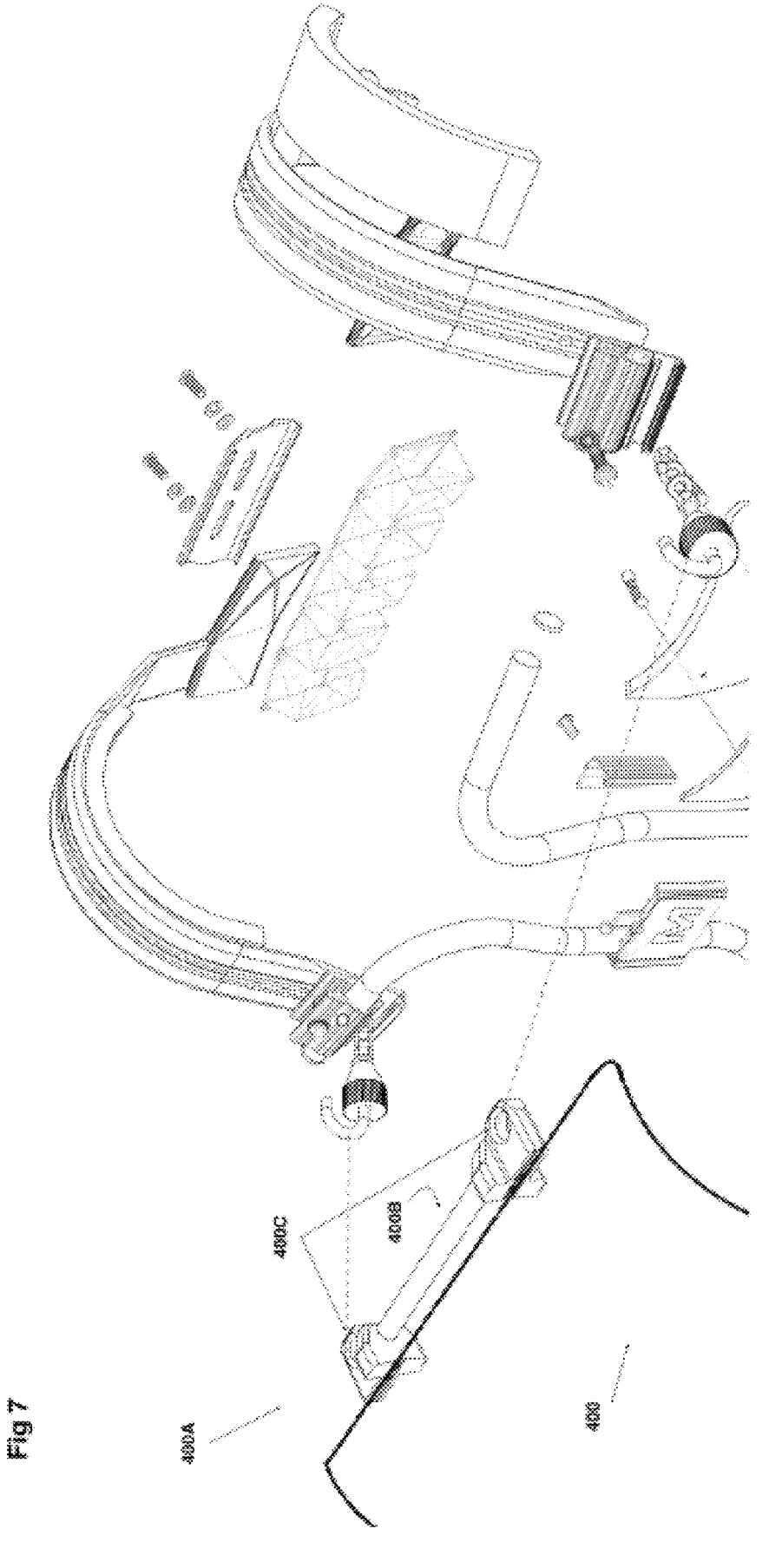
FIG. 7 illustrates aspects of the percussion instrument hardware according to at least one embodiment.

As shown in FIGS. 6 and 7, in some embodiments, the tube bridge 440A may be a retrofit tube bridge configured to be retrofit to the percussion instrument in an after-market modification. The tube bridge 440A may include a bridge tube 440b suspended between opposing mounts 400c, which may be mountable on the percussion instrument. In operation, the bridge tube may be dropped-and-locked into the instrument mount 200/222 as described above.

In some embodiments, the mounts 400-c include respective eye loops. The eye loops may be oriented perpendicular to the tube bridge so as to accept respective j-hooks of an instrument carrier that support the percussion instrument on a user's body (e.g., the carriers of U.S. Pat. No. 7,326,842), as shown in FIG. 7.

The percussion instrument stand 100 may further include a bass drum support 224, particularly in embodiments where the percussion instrument 400 is a bass drum. The bass drum support 224 may be longitudinally adjustable on one of the support columns so as to enable the bass drum to rest thereon. In combination with the tube bridge 440A and the instrument mount 200/222, the longitudinal adjustment of the bass drum support 224 allows for the rotational repositioning of the bass drum 400 to a preferred playing zone.

The features described above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A percussion instrument stand, comprising:
    a plurality of support columns, wherein each support column is associated with a respective support leg that supports the support column off of a standing surface;
    an instrument mount configured to receive a horizontal tube of a percussion instrument such that, during normal playing of the percussion instrument, the instrument mount supports the percussion instrument thereon so that the percussion instrument is vertically supported by one or more of the support columns; and
    at least one coupler having a contiguous body defining a plurality of horizontally-oriented c-shaped and/or o-shaped receptacles that are each configured to engage a respective support column so as to resist a horizontal torque exerted on the percussion instrument.

2. The percussion instrument stand of claim 1, wherein each receptacle comprises a clamp having at least one protrusion configured to fit within a corresponding vertical groove of the respective support column such that the coupler is vertically repositionable with respect to the support columns.

3. The percussion instrument stand of claim 1, wherein at least one of the receptacles comprises a continuous body circumferentially enclosing the respective support column such that the receptacle is vertically repositionable with respect to the support columns.

4. The percussion instrument stand of claim 1, wherein the coupler is substantially triangular in shape.

5. The percussion instrument stand of claim 1, wherein the instrument mount comprises a catch-lock configured to catch-and-lock a tube lug or a tube bridge of the percussion instrument therein.

6. The percussion instrument stand of claim 5, wherein the tube bridge is suspended between the pair of mounts mounting the tube bridge to a shell of the percussion instrument so as to be parallel to the shell.

7. The percussion instrument stand of claim 1, wherein the instrument mount comprises a gravity drop-and-lock saddle configured to seat and secure a tube lug or a tube bridge of the percussion instrument therein.

8. A supporting hardware for a percussion instrument, comprising:
    a pair of mounts configured to be mounted to a shell of the percussion instrument; and
    a tube bridge suspended between the pair of mounts so as to be parallel to the shell when the pair of mounts are mounted to the shell,
    wherein each mount of the pair of mounts includes an eye loop oriented perpendicular to the tube bridge so as to accept respective j-hooks of an instrument carrier configured to support the percussion instrument on a user's body, and
    wherein the tube bridge is configured to be engaged by an instrument mount comprising a gravity drop-and-lock saddle configured to seat and secure the tube bridge therein.

9. The supporting hardware of claim 8, wherein the tube bridge is configured to be engaged by an instrument mount comprising a catch-lock operable to catch-and-lock the tube bridge therein.

10. A percussion instrument stand, comprising:
    a plurality of support columns, wherein each support column is associated with a respective support leg that supports the support column off of a standing surface;
    an instrument mount configured to receive a percussion instrument such that, during normal playing of the percussion instrument, the instrument mount supports the percussion instrument thereon so that the percussion instrument is vertically supported by one or more of the support columns; and
    at least one coupler having a contiguous body defining a plurality of horizontally-oriented c-shaped and/or o-shaped receptacles that are each configured to engage a respective support column so as to resist a horizontal torque exerted on the percussion instrument.

11. The percussion instrument stand of claim 10, wherein each receptacle comprises a clamp having at least one protrusion configured to fit within a corresponding vertical groove of the respective support column such that the coupler is vertically repositionable with respect to the support columns.

12. The percussion instrument stand of claim 10, wherein at least one of the receptacles comprises a continuous body circumferentially enclosing the respective support column such that the receptacle is vertically repositionable with respect to the support columns.

13. The percussion instrument stand of claim 10, wherein the coupler is substantially triangular in shape.

14. The percussion instrument stand of claim 10, wherein the instrument mount comprises a catch-lock configured to catch-and-lock a tube lug or a tube bridge of the percussion instrument therein.

15. The percussion instrument stand of claim 14, wherein the tube bridge is suspended between the pair of mounts mounting the tube bridge to a shell of the percussion instrument so as to be parallel to the shell.

16. The percussion instrument stand of claim 10, wherein the instrument mount comprises a gravity drop-and-lock saddle configured to seat and secure a bridge of the percussion instrument therein.

* * * * *